US008102756B2

(12) United States Patent
Mukkavilli et al.

(10) Patent No.: US 8,102,756 B2
(45) Date of Patent: Jan. 24, 2012

(54) METHOD AND APPARATUS FOR INITIAL ACQUISITION OF SIGNALING PARAMETERS FOR A WIRELESS COMMUNICATIONS NETWORK

(75) Inventors: Krishna Kiran Mukkavilli, San Diego, CA (US); Ashok Mantravadi, San Diego, CA (US); Raghuraman Krishnamoorthi, San Diego, CA (US); Murali Ramaswamy Chari, San Diego, CA (US); Tao Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 886 days.

(21) Appl. No.: 11/834,669

(22) Filed: Aug. 6, 2007

(65) Prior Publication Data

US 2009/0028257 A1    Jan. 29, 2009

Related U.S. Application Data

(60) Provisional application No. 60/951,948, filed on Jul. 25, 2007.

(51) Int. Cl.
*H04J 11/00* (2006.01)
*H04Q 7/00* (2006.01)
(52) U.S. Cl. ....................... 370/210; 370/330
(58) Field of Classification Search ............ 375/260; 370/208–210, 328–330, 349–350
See application file for complete search history.

(56) References Cited

U.S. PATENT DOCUMENTS

| 2003/0032389 | A1* | 2/2003 | Kim et al. ............... 455/3.01 |
| 2004/0185853 | A1* | 9/2004 | Kim et al. ............... 455/438 |
| 2005/0122928 | A1* | 6/2005 | Vijayan et al. ........... 370/312 |
| 2007/0060048 | A1* | 3/2007 | Kang et al. ............. 455/13.1 |
| 2007/0070963 | A1  | 3/2007 | Li et al. |
| 2007/0081484 | A1* | 4/2007 | Wang ...................... 370/315 |
| 2008/0020768 | A1  | 1/2008 | Li et al. |
| 2010/0029279 | A1* | 2/2010 | Lee et al. ............... 455/436 |

FOREIGN PATENT DOCUMENTS

| EP | 1463347    | 9/2004 |
| WO | 2007042424 | 4/2007 |
| WO | 2007052995 | 5/2007 |

OTHER PUBLICATIONS

International Preliminary Report on Patentability, PCT/US2008/071204, International Bureau, The International Bureau of WIPO, Feb. 4, 2010.
International Search Report and Written Opinion—PCT/US2008/071204, International Search Authority—European Patent Office—Feb. 23, 2009.

* cited by examiner

*Primary Examiner* — Hassan Phillips
*Assistant Examiner* — Eunsook Choi
(74) *Attorney, Agent, or Firm* — Ryan N. Farr

(57) ABSTRACT

A method of acquiring a forward link only (FLO) network in a radio frequency (RF) in a wireless communication environment, includes selecting a RF from a first list; selecting a signal parameter (SP) from a second list; determining if a first parameter is found using the selected RF and SP; and, upon determination that the first parameter is found, enabling the use of the selected RF and SP to communicate in the FLO network. An apparatus for implementing the method is also disclosed.

36 Claims, 8 Drawing Sheets

METHOD AND APPARATUS FOR INITIAL ACQUISITION OF SIGNALING PARAMETERS FOR A WIRELESS COMMUNICATIONS NETWORK

CLAIM OF PRIORITY UNDER 35 U.S.C. §119

The present Application for patent claims priority to Provisional Application No. 60/951,948 entitled "METHOD AND APPARATUS FOR INITIAL ACQUISITION OF SIGNALING PARAMETERS FOR A WIRELESS COMMUNICATIONS NETWORK" filed Jul. 25, 2007, and assigned to the assignee hereof and hereby expressly incorporated by reference herein.

BACKGROUND

1. Field

The present invention relates generally to wireless communications, and more particularly, to a method and apparatus for initial acquisition of signaling parameters for a wireless communications network.

2. Background

Wireless communication networks such as the Forward Link Only (FLO) network have been designed to provide real time audio and video multicasting to mobile devices. The FLO system is designed to work in a mobile environment where the channel characteristics in terms of the number of channel taps with significant energy, path gains and the path delays are expected to vary quite significantly over a period of time. To achieve good receiver performance and high spectral efficiency, the FLO network uses Orthogonal Frequency Division Multiplexing (OFDM) as the modulation technique. In the OFDM approach, the available bandwidth is divided into N bins, referred to as sub-carriers, with each sub-carrier modulated by a Quadrature Amplitude Modulated (QAM) symbol. The timing synchronization block in a receiver device responds to changes in the channel profile by selecting the OFDM symbol boundary appropriately to maximize the energy captured in the Fast Fourier Transform (FFT) window.

One important principle of OFDM is that a number of low-rate streams is transmitted in parallel instead of a single high-rate stream, because low symbol rate modulation schemes (i.e., schemes where the symbols are relatively long compared to the channel time characteristics) suffer less from interference caused by multipath. Since the duration of each symbol is long, it is feasible to insert a guard interval between the OFDM symbols to reduce the intersymbol interference. During the guard interval, a cyclic prefix, which consists of the end of the OFDM symbol, is transmitted with the OFDM symbol. The reason that the guard interval includes a copy of the end of the OFDM symbol is so that the receiver will integrate over an integer number of sinusoid cycles for each of the multipaths when it performs OFDM demodulation with FFT.

The signaling parameters (SP) of a particular FLO network, such as the FFT size as well as the guard interval, need to be determined by a wireless receiver device during the power-up or initialization process. Otherwise, the receiver cannot decode the waveforms of the FLO network if it does not know the proper SP. Given the nature of FLO broadcasts that support multimedia data acquisitions, the time required of the acquisition process, and initialization process in general, needs to be kept to a minimum. Preferably, the reduction of time for a device to acquire the FLO network will reduce the wait time of a user for the device.

SUMMARY OF THE PREFERRED EMBODIMENTS

The following presents a simplified summary of various configurations of the subject technology in order to provide a basic understanding of some aspects of the configurations. This summary is not an extensive overview. It is not intended to identify key/critical elements or to delineate the scope of the configurations disclosed herein. Its sole purpose is to present some concepts in a simplified form as a prelude to the more detailed description that is presented later.

In one aspect of the disclosure, a method of acquiring a forward link only (FLO) network in a radio frequency (RF) in a wireless communication environment, includes selecting a RF from a first list; selecting a signal parameter (SP) from a second list; determining if a first parameter is found using the selected RF and SP; and, upon determination that the first parameter is found, enabling the use of the selected RF and SP to communicate in the FLO network.

In another aspect of the disclosure, an apparatus that facilitates detecting a forward link only (FLO) network in a wireless communication environment, includes a memory that stores a first list of RF channels and a signal parameter (SP); a processor, coupled to the memory, that selects a RF channel from the first list; a receiver coupled to the processor that communicates with an RF channel; and wherein the processor determines if a first parameter is found using the selected RF channel and SP and, upon determination that the first parameter is found, enabling the use of the corresponding SP to communicate in the FLO network.

In a further aspect of the disclosure, a product includes machine-readable media with programming code stored thereon that, when executed by a processor, implements a method of acquiring a forward link only (FLO) network in a radio frequency (RF) in a wireless communication environment. The method includes selecting a RF from a first list; selecting a signal parameter (SP) from a second list; determining if a first parameter is found using the selected RF and SP; and, upon determination that the first parameter is found, enabling the use of the selected RF and SP to communicate in the FLO network.

It is understood that other configurations will become readily apparent to those skilled in the art from the following detailed description, wherein it is shown and described only various configurations by way of illustration. As will be realized, the teachings herein may be extended to other and different configurations and its several details are capable of modification in various other respects, all without departing from the scope of the present disclosure. Accordingly, the drawings and detailed description are to be regarded as illustrative in nature and not as restrictive.

DETAILED DESCRIPTION

Figure 1:
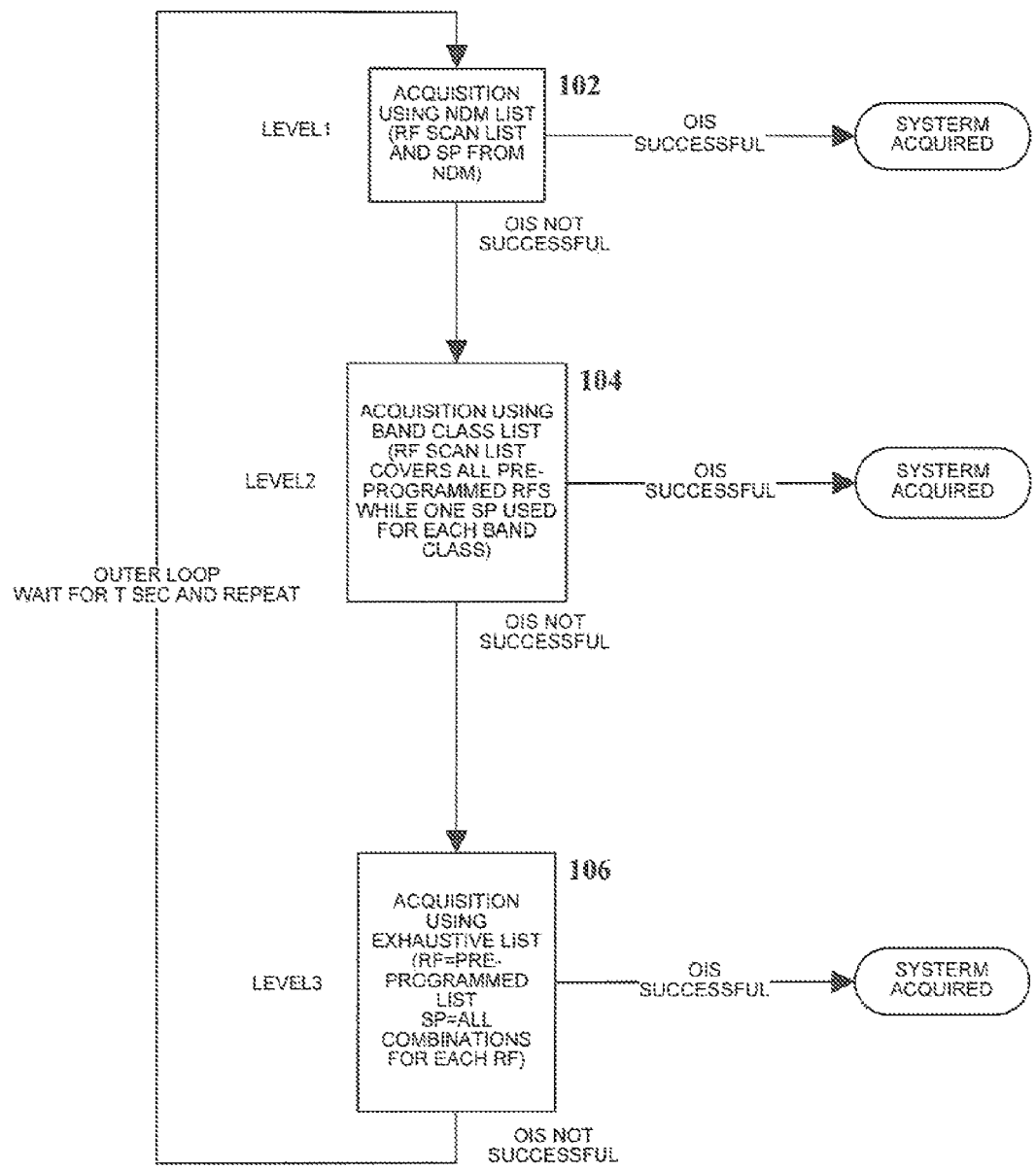
FIG. 1 is a state diagram incorporating different complexity levels of FLO network acquisition covering various combinations of RF frequencies with signal parameters.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

In order to minimize the acquisition time of the FLO network upon power up of a device, the preferred embodiment uses a hierarchical approach of gradually more complex algorithms to determine the FLO network SP. A power up sequence 100 to be followed in a device when multiple Signal Parameters (SP) in terms of FFT size, cyclic prefix and slot to interlace map are supported by the receiver in addition to multiple RF frequencies for a given bandwidth of operation are shown in FIG. 1. Specifically, the state diagram corresponding to the general acquisition process is shown in FIG. 1. The power up sequence described herein will scan different SPs along with RF frequencies in order to determine the FLO network that will be used for receiving the FLO services. The large number of combinations with multiple RF and SP options could result in a long power up delay. Therefore, the proposed algorithm scans the possible list of parameters in three steps.

In step 102, at the first level of acquisition, the device scans for FLO signal using the information that was last available before the device was powered down. The last known good information is maintained in a Neighborhood Description Message (NDM) table stored in the device based on successful decoding of a control channel in the FLO network. In particular, the NDM table contains the list of Radio Frequency (RF) channels where FLO services are available in the geographical location of the device along with the signal parameters used in each of the RF channels. There is a high probability that the device may still be in the vicinity of the location when it was last powered down. Therefore, starting with the restricted set given by the NDM table could potentially improve the acquisition time. During this step, a RF_S-CAN_LIST, which is the list of RFs to be scanned, is first obtained from the last successful NDM table. In one preferred embodiment, the NDM list also contains SP information for each RF.

In one preferred embodiment, the SP of the FLO system is conveyed through two SP Channel (SPC) symbols at the PHY layer for the local FLO coverage region, or through an NDM message (retrieved in the control channel) for the neighboring service regions once the device is able demodulate and process NDM messages (or, as stated above, if the device has previously retrieved NDM information in memory, then both local and neighboring services).

As noted previously, FLO signal parameters comprise of the FFT size, cyclic prefix length and slot to interlace map being used by the FLO waveform. The FLO device needs to possess this information before the FLO waveform can be successfully decoded. The SP information is conveyed in the SPC, which comprises two OFDM symbols. The information conveyed in the first SPC symbol is as follows:

TABLE 1

Information conveyed by SPC

| SPC Symbol Index | Bits | OFDM Symbol Parameter |
|---|---|---|
| 0 | [$p_7 p_6 p_5$] | FFT Size ($N_{FFT}$) |
| 0 | [$p_4 p_3$] | Slot to interlace map |
| 0 | [$p_2 p_1 p_0$] | $FGI_{Fraction}$ |
| 1 | [$p_7 p_6 p_5 p_4 p_3 p_2 p_1 p_0$] | Reserved for Future Use |

For the purpose of system acquisition in, only SPC symbol 0 needs to be processed since SPC symbol 1 contains reserved fields for future use. However, the algorithms proposed herein are applicable even when SPC symbol 1 is processed to get any additional information that may be added to the system. Further, the 8 bits of information obtained from the SPC symbol 0 is referred to as the SP herein. In essence, the FFT size, cyclic prefix length and slot to interlace map can be determined from the SPC symbols. In one embodiment, where the FLO network supports different combination of SPs, including different FFT sizes: 1024 (also referred to as "1 k" mode), 2048 (2 k), 4096 (4 k) and 8192 (8 k); different frequency guard intervals (FGI): 1/16, 1/8, 3/16 and 1/4; and slot to interface mappings, the association of the bits comprising the SPC symbols to different modes is as follows.

| Bits [$p_7 p_6 p_5$] | FFT Size | Bits [$p_2 p_1 p_0$] | FGI Fraction | Bits [$p_4 p_3$] | Slot to Interlace mapping |
|---|---|---|---|---|---|
| 000 | 1024 | 000 | 1/16 | 00 | Mapping 1 |
| 001 | 2048 | 001 | 1/8 | 01 | Mapping 2 |
| 010 | 4096 | 010 | 3/16 | 10 | Mapping 3 |
| 011 | 8192 | 011 | 1/4 | 11 | Reserved for future use |
| 100-111 | Reserved for future use | 100-111 | Reserved for future use | | |

In one particular embodiment, the algorithms described herein obtains the SP information from the SPC and programs it back to the hardware for operation with the decoded SP information, as further discussed herein.

Figure 8:
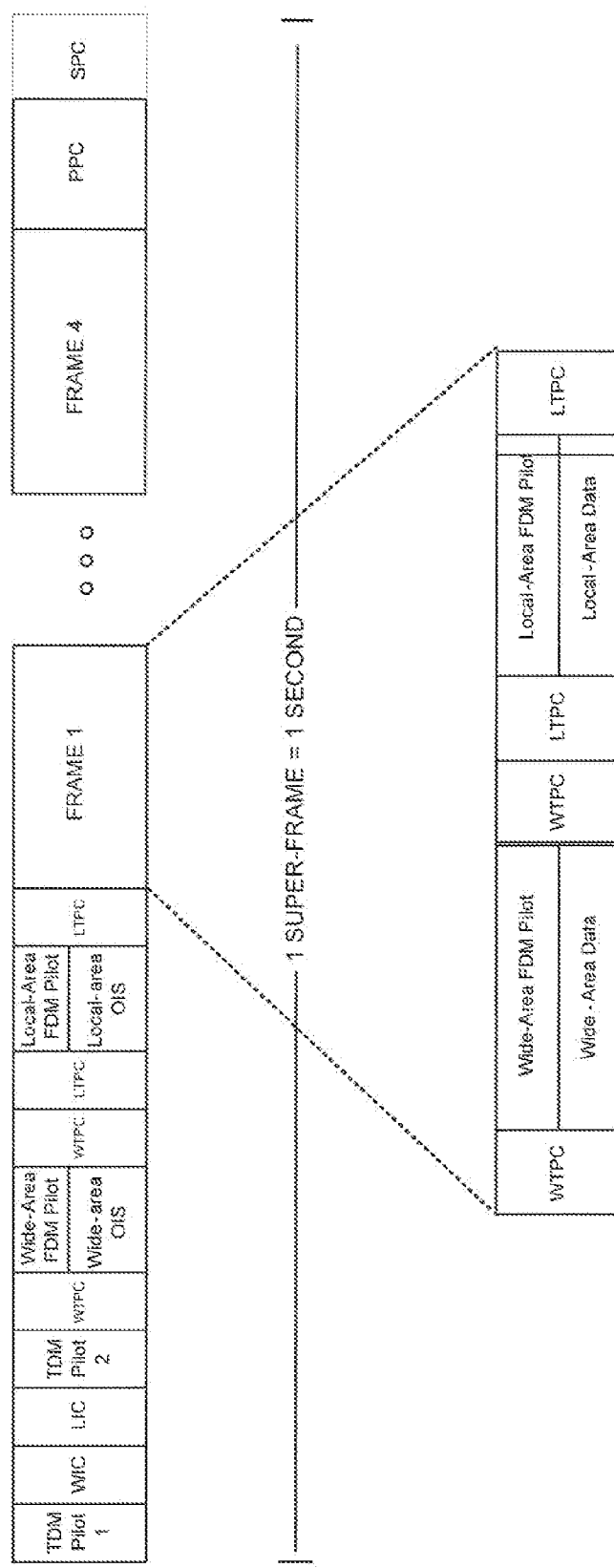
FIG. 8 illustrates an exemplary FLO physical layer superframe that has been configured to add support for the conveying of signaling parameter information to receivers using a signaling parameter channel (SPC).

Before transmission, FLO data is generally organized into super frames. Each super frame has a one second duration. A super frame generally consists of 1,200 symbols (or variable number of OFDM symbols based on the bandwidth being used) that are OFDM modulated with 4,096 sub-carriers. Among the 1,200 OFDM symbols in a super frame, there are: two Time Division Multiplexing (TDM) pilot symbols (TDM1, TDM2); one wide-area and one local identification channel (WIC and LIC) symbols; fourteen Overhead Information Symbol (OIS) channel symbols, including four Transitional Pilot Channel (TPC) symbols; eight Positioning Pilot Channel (PPC) symbols for assisting with position location;

two SPC symbols and four data frames. TDM Pilot Symbol 1 (TDM1) is the first OFDM symbol of each super-frame, where TDM1 is periodic. The OIS symbols contains the mapping of the data—i.e., symbols, that is being transferred for each channel of interest. The receiver uses TDM1 for frame synchronization and initial time (coarse timing) and frequency acquisition. An exemplary super-frame structure 800 is shown in FIG. 8.

In step 104, if the first level of step 102 does not result in FLO acquisition, or if the first level is not possible (e.g., first power up where NDM is not available), the device will enter the second level of acquisition. In the second level, the RF_SCAN_LIST covers all the possible RF, available through a pre-programmed list, while for each RF frequency, the SP option is limited to one using band class information. Specifically, each FLO device is pre-provisioned with a list of RF frequencies and associated channel plan. The pre-provisioned list will contain RFs to accommodate mobility/roaming between different FLO deployment areas.

In step 106, if the level 2 process also does not result in successful FLO acquisition, then the device will go through all the possible combinations of pre-programmed RFs along with all the pre-programmed SPs.

Finally, there is an outer loop that is utilized if all the three levels of acquisition fail. The outer loop involves a timer for T seconds and upon the expiry of the timer, the device again goes through the three levels of acquisition in the same sequence. The time used in the outer loop time T in particular can be fixed or can be varied in a pre-determined fashion for successive outer loop operations.

Figure 2:
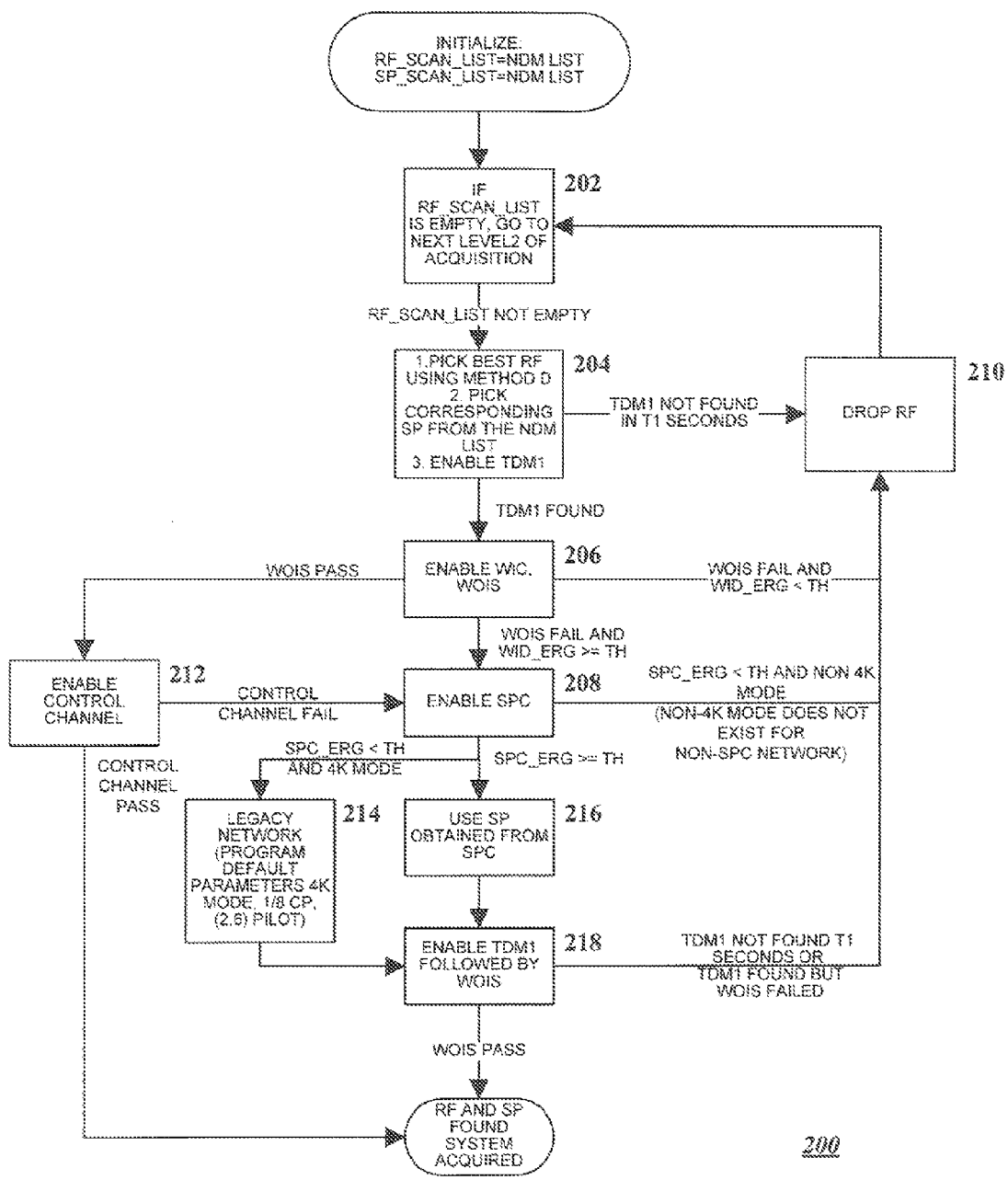
FIG. 2 is a state diagram for a level 1 acquisition process using the RF and SP information from a NDM.

A detailed explanation in the form of a state diagram for level 1 acquisition is shown in FIG. 2, which uses the RF and SP information from the NDM table. In particular, the device starts off by initializing both the RF_SCAN_LIST as well as the SP_SCAN_LIST for each RF based on NDM. From the RF frequencies available in the RF scan list, best RF is picked based on either the total power measured in the bandwidth of FLO operation or signal to noise ratio or any other metric for signal quality. In particular, when the metric used is the total signal power measured in the FLO bandwidth in a particular RF, it is referred to as Method D. For each RF that is picked, the corresponding SP based on NDM is programmed to the hardware.

FIG. 2 is a detailed state diagram for a level 1 acquisition process 200 using the RF and SP information retrieved from the NDM list.

In step 204, in one exemplary embodiment, the software enables TDM1 processing. If TDM1 is not detected in T1 seconds (T1=1.1 seconds in one embodiment), then the RF will be dropped from the RF_SCAN_LIST in step 210. Method D is performed again and the process is repeated on the new RF along with the corresponding SP from the NDM list. If all the RFs in the RF_SCAN_LIST are exhausted without detecting TDM1, as in step 202, then the acquisition process will proceed to level 2, as detailed in FIG. 3.

Generally, after TDM1, which is periodic, is obtained, the FFT mode may be obtained because the FFT mode is encoded in the periodicity of the TDM1. Specifically, the periodicity of TDM1 indicates the FFT mode. However, TDM1 may be obtained without looking at the actual period of the transmission of TDM1. In another embodiment, determining if the WID_energy is determined to be greater-than-or-equal-to a predetermined threshold, then the system can obtain the SP directly.

If TDM1 is detected in the particular RF of interest within T1 seconds, a wide-area identification (WID) channel (WIC) and a wide area overhead information symbol (WOIS) are processed as well in step 206. If WOIS is successful, the assumed SP for the FFT size and pilot patterns are correct. The receiver then proceeds to decode the control channel in step 212. If the control channel is decodable, then the correct parameters, including the RF and SP, have been assumed/found and the system is acquired. The control channel describes how many channels exist in the system, how they are encoded—e.g., modulation and coding parameters. The receiver can decode an OFDM symbol if the control channel is receivable. Even if the receiver has information such as the OIS, FFT and pilot pattern information, it does not mean that the receiver has all the SPs necessary to communicate with the FLO network. For example, successful decoding of the OIS does not ensure that the cyclic prefix length is known or presumed correctly at the receiver. However, if the control channel can be decoded, then the cyclic prefix length assumed at the receiver is matched to the received waveform. Therefore, the receiver first attempts to decode the control channel to check whether the assumed SP matches with the received waveform. However, if the control channel processing fails, then SPC processing is enabled in step 208.

Returning to step 206, even if WOIS detection is not successful, the decoding metrics from the WIC and LIC symbols may be used to determine if the receiver is synchronized to the FLO super-frame boundary. In one particular embodiment, WIC channel is processed at the receiver using all the possible combinations of the WID field. An energy metric based on the channel quality obtained with each choice of WID may be defined. The largest energy metric may then be compared against a threshold that is pre-programmed or computed on the fly. If the WID energy metric is less than the threshold then it signifies a false alarm. The corresponding RF is dropped from the RF_SCAN_LIST in step 210 and the process is repeated on a new RF. If the WID energy metric is greater than the threshold, super-frame synchronization is guaranteed to a large extent and hence SPC processing is enabled in step 208.

In step 208, an energy metric based on the channel quality can be obtained for each choice of the SP. The largest energy metric thus obtained is referred to as the SPC energy (SPC_ERG). If SPC energy is less than the threshold and the system is in the default mode, referred to the "4 k mode," then the legacy network SP of 1/8 CP and (2, 6) pilot should be used and a false alarm claimed for a non 4 k mode in step 214. If SPC energy is greater than the threshold, the information from SPC is then used in step 216 to detect TDM1 and WOIS in step 218. In one embodiment, the parameters from SPC are used to overwrite the hardware version of the mode registers as well. If TDM1 is not detected within T1 seconds or WOIS fails, then the RF is dropped from the RF_SCAN_LIST 210.

Figure 3:
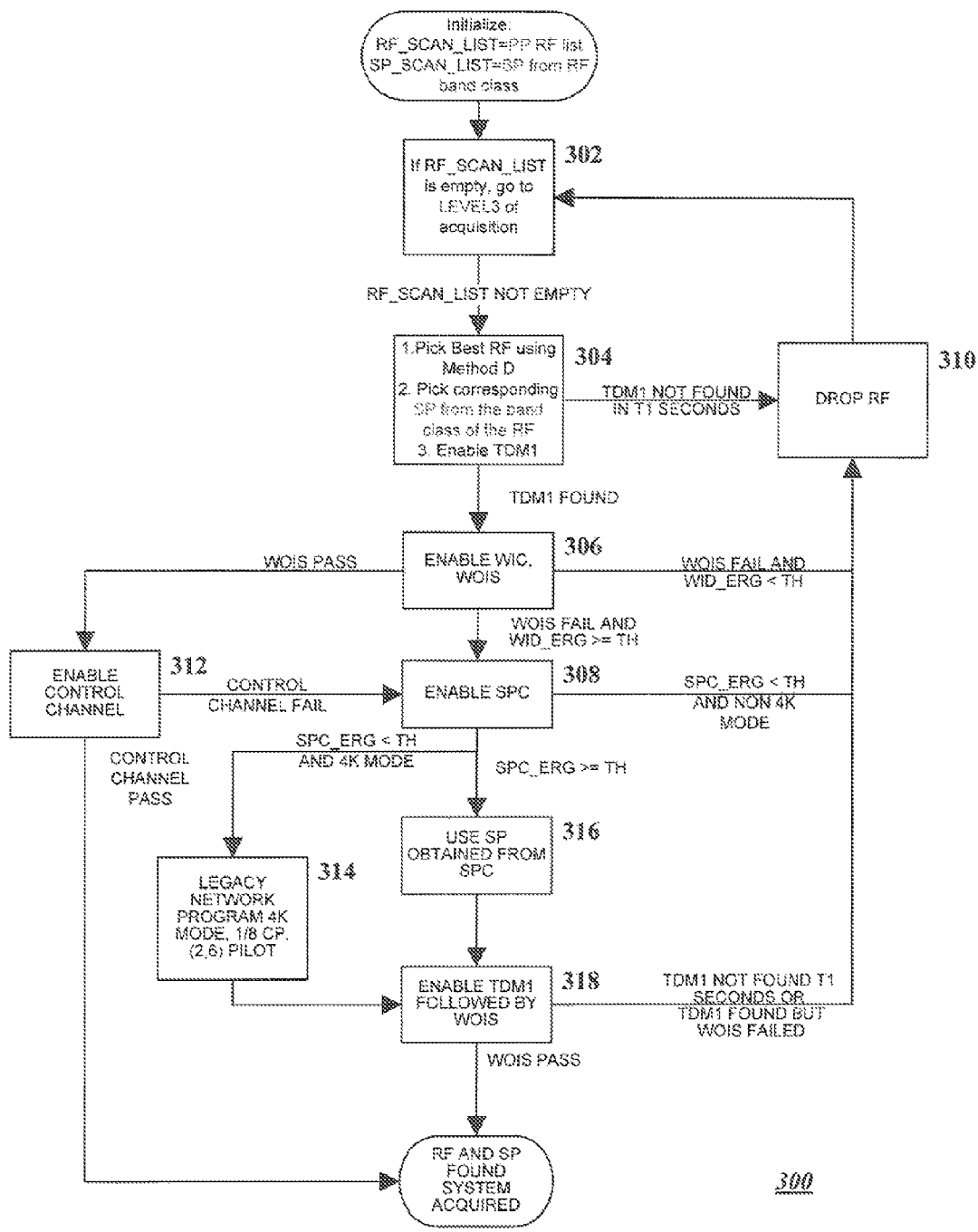
FIG. 3 is a state diagram for a level 2 acquisition using preprogrammed RF list and SP from the band class information.

FIG. 3 details a state diagram for level 2 acquisition that uses a preprogrammed RF list and SP from the band class information when the level 1 acquisition, which uses the NDM list, is unsuccessful. Thus, if all the RF frequencies are exhausted in level 1, then the acquisition proceeds to level 2 where the RF_SCAN_LIST is expanded beyond the NDM table to cover the entire pre-programmed list. However, the SP options are limited to a restricted set that may be obtained by mapping the RF frequencies to one of the three band classes in step 314. In particular, the following mapping is an exemplary embodiment that may be used to determine the SP parameters to be programmed for different band classes:

TABLE 2

Default band class SP information

| RF Frequency | FFT Size | CP Length | Slot to Interlace Map |
|---|---|---|---|
| VHF band (<472 MHz) | 8K | ⅛ | Mapping 1 |
| UHF band (472 MHz < RF < 860 MHz) | 4K | ⅛ | Mapping 1 |
| L band (RF > 1 GHz) | 2K | ⅛ | Mapping 1 |

With this band class information for SP, level 2 acquisition is performed similar to the level 1 acquisition using the state diagram as shown in FIG. 3, where steps 306-318 correspond to similarly numbered steps 206-218, respectively. If the FLO system is not acquired even after the entire pre-programmed RF list is exhausted, as determined in step 302, then a level 3 acquisition is performed.

In the level 2 acquisition, the RF_SCAN_LIST is comprised of the entire pre-programmed list while the SP_SCAN_LIST for each RF is comprised of only one SP set, depending on the band class of the RF. In the level 3 acquisition, which is the most exhaustive one, in one embodiment all the possible SP sets (pre-programmed) are tried for each of the RF frequencies in the pre-programmed list, as shown in step 420, where an index of all the SPs (SP_IDX) is used to walk through all the SPs in the SP_SCAN_LIST.

Figure 4:
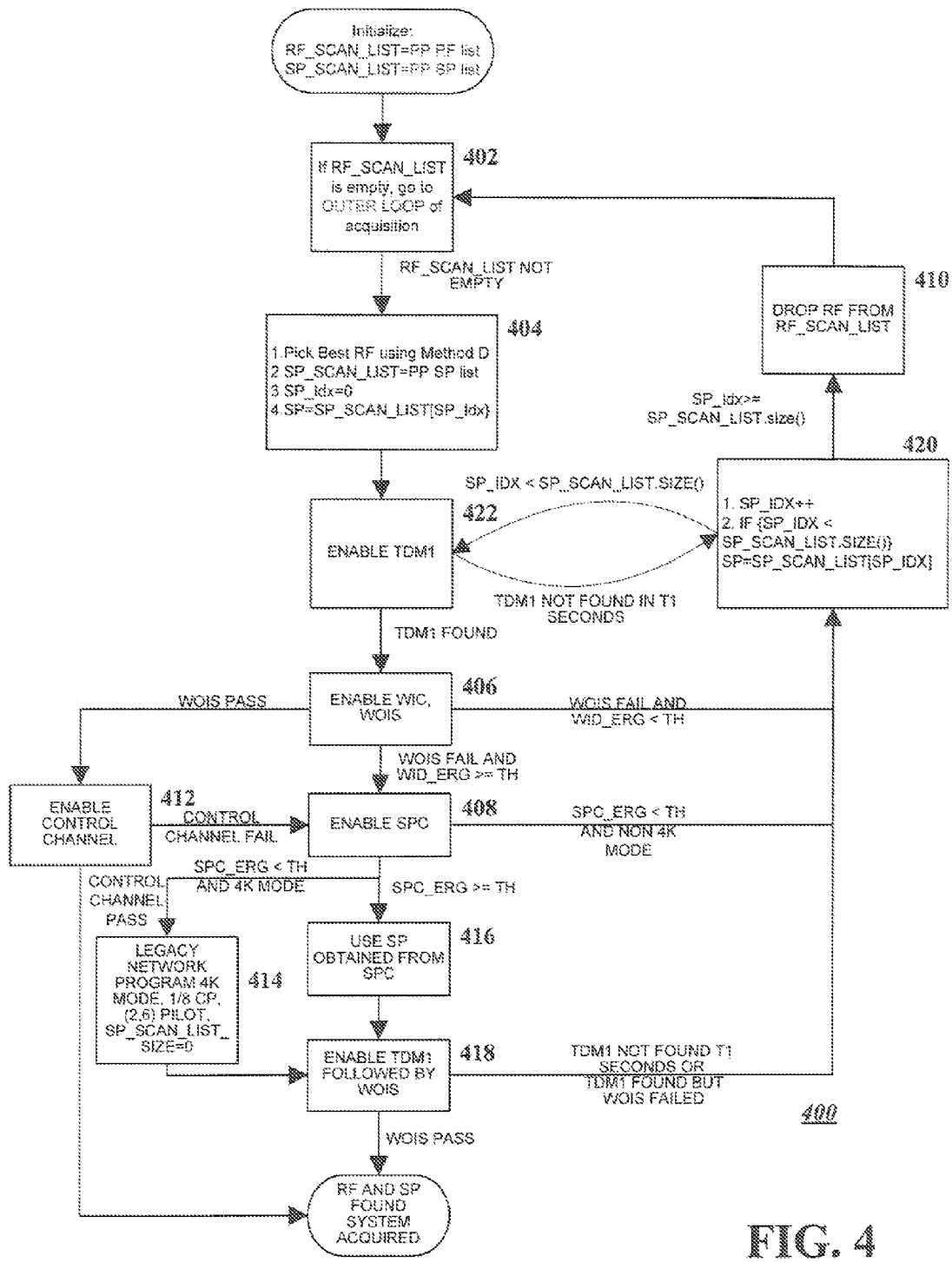
FIG. 4 is a state diagram for a level 3 acquisition using the entire pre-programmed RF list and pre-programmed SP list.

The state diagram for the level 3 acquisition is illustrated in FIG. 4. In particular, the sequence is as follows. RF_SCAN_LIST is first set to the pre-programmed list upon initialization of the process. In step 404, method D monitoring is use to pick the best RF from those available in RF_SCAN_LIST. In addition, the SPC_SCAN_LIST is then set to span all the possible combinations for the SPC parameters for the winning RF, where SP_SCAN_LIST=PP SP list. A search is then performed for TDM1 in step 422. If TDM1 is not found, SP_IDX is incremented in step 420 so that the next SP in the SP_SCAN_LIST may be used to detect TDM1.

Assuming TDM1 is found, each of the SPC sets is used to scan for FLO service as shown in steps 406-408 and 412-418, where steps 406-408 and 412-418 correspond to similarly numbered steps 206-208 and 212-218. In addition, step 414 includes the setting of SP_SCAN_LIST_SIZE equal to 0, which has the effect of dropping the RF if TDM1 is not found, and no further SPs are tested for that RF. If all the SPC combinations in the SPC_SCAN_LIST are exhausted without successful WOIS detection, then the RF frequency is dropped from the RF_SCAN_LIST in step 410 and the process is repeated for the next best RF frequency from the RF_SCAN_LIST in step 404. This process is repeated until FLO service is discovered with a particular combination of RF and SP or until all the RF frequencies in the RF_SCAN_LIST have been tried out.

If FLO service is not found at the end of the level 3 acquisition process as shown in step 402, then an outer loop as shown in FIG. 1 comes into use. Specifically, referring back to FIG. 1, the device is put to sleep for T seconds, where T=20 seconds in a particular embodiment, and then the acquisition process, starting with level 1 and carried through level 3, is repeated until the FLO service is found or the end of the level 3 acquisition process is reached. The time T used in the outer loop may vary if the outer loop is executed multiple times. In a particular embodiment, if the device enters the outer loop the first time after power up, time $T_{01}$ seconds, where $T_{01}$ is 20 seconds, may be used. After $T_{01}$ seconds, the device goes through one or more of the three levels of acquisition again and if FLO service is still not discovered, then the device may be put to sleep for $T_{02}$ seconds, which may be different from $T_{01}$. Thus, the device may use a different time duration for sleep each time it enters outer loop.

To further increase the responsiveness of the system, the receiver in one embodiment is configured to buffer data so that at least the last two symbols are stored. Thus, when TDM1 is found by any of the acquisition algorithms described herein, the system can retrieve the previously received SPC from the buffer and use the parameters associated with the SPC for decoding the WOIS.

Figure 5:
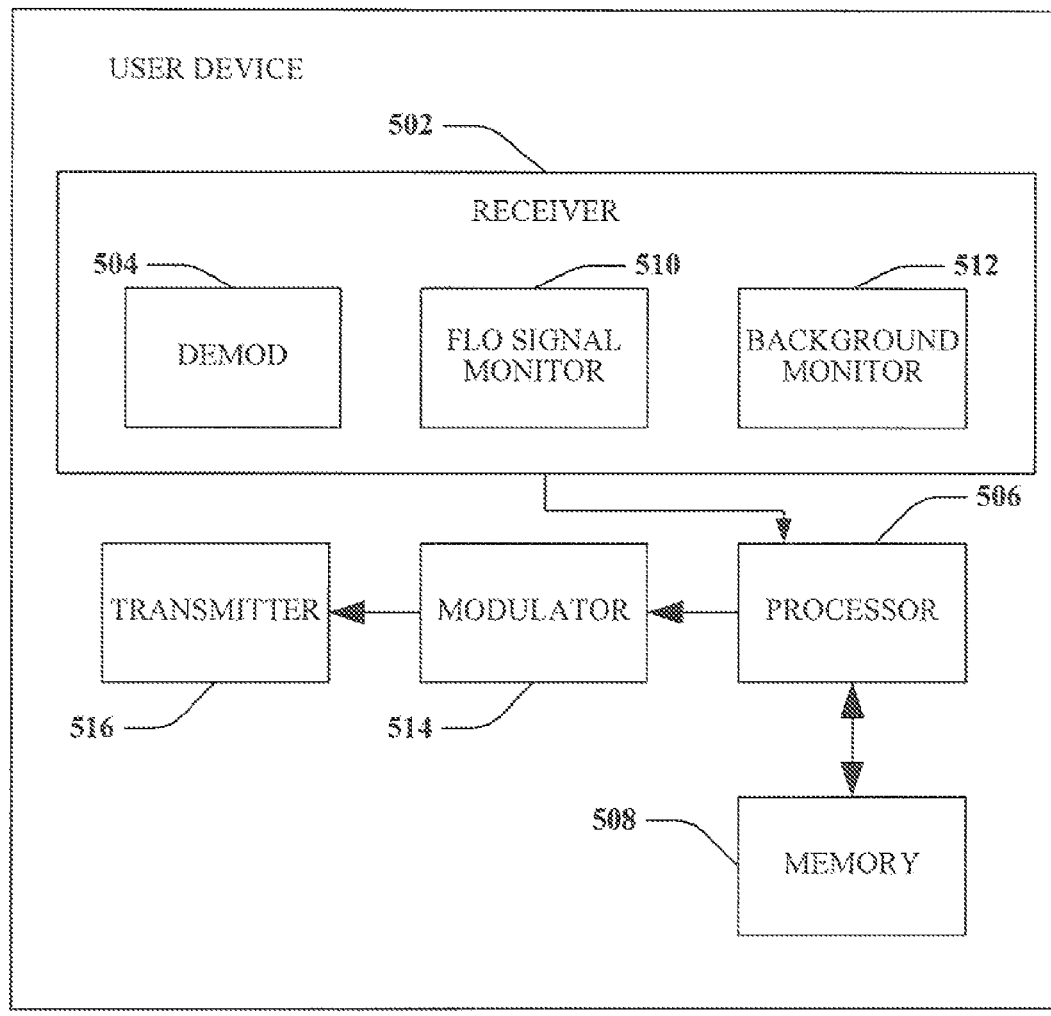
FIG. 5 is an illustration of a user device that facilitates a FLO network acquisition in a wireless communication environment, in accordance with one or more aspects set forth herein.

FIG. 5 is an illustration of a user device 500 that may be used to implement the FLO network detection process in a wireless communication environment, in accordance with one or more aspects set forth herein. User device 500 comprises a receiver 502 that receives a signal from, for instance, a receive antenna (not shown), and performs typical actions thereon (e.g., filters, amplifies, downconverts, etc.) the received signal and digitizes the conditioned signal to obtain samples. A demodulator 504 can demodulate and provide received pilot symbols to a processor 506 for channel estimation. Processor 506 can be a processor dedicated to analyzing information received by receiver 502 and/or generating information for transmission by a transmitter 516, a processor that controls one or more components of user device 500, and/or a processor that both analyzes information received by receiver 502, generates information for transmission by transmitter 516, and controls one or more components of user device 500.

User device 500 can additionally comprise memory 508 that is operatively coupled to processor 506 and that stores information related to RF channel identity, TDM pilot information associated therewith, TDM pilot counter adjustments, lookup table(s) such as the NDM table and information related thereto, and any other suitable information for supporting monitoring and/or switching RF channels to provide seamless information display to a user in a wireless communication system as described herein. Memory 508 can additionally store protocols for RF channel monitoring, RF channel switching, etc., such that user device 500 can employ stored protocols and/or algorithms to perform the various methods described herein.

It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1108 of the subject systems and methods is intended to comprise, without being limited to, these and any other suitable types of memory.

Receiver 502 can further comprise a FLO channel monitor 510 that facilitates initiating monitoring of new FLO RF channels. Additionally and/or alternatively, FLO channel monitor 510 can perform application-initiated FLO channel monitoring. Receiver 502 can still further comprise a background monitor 512 that performs various actions related to background monitoring of one or more RF channels. For example, background monitor 512 can enforce several constraints related to the DC, AGC, AFC, and timing blocks, in order to restore the receiver operation on the original channel when an RF frequency is switched back.

Figure 6:
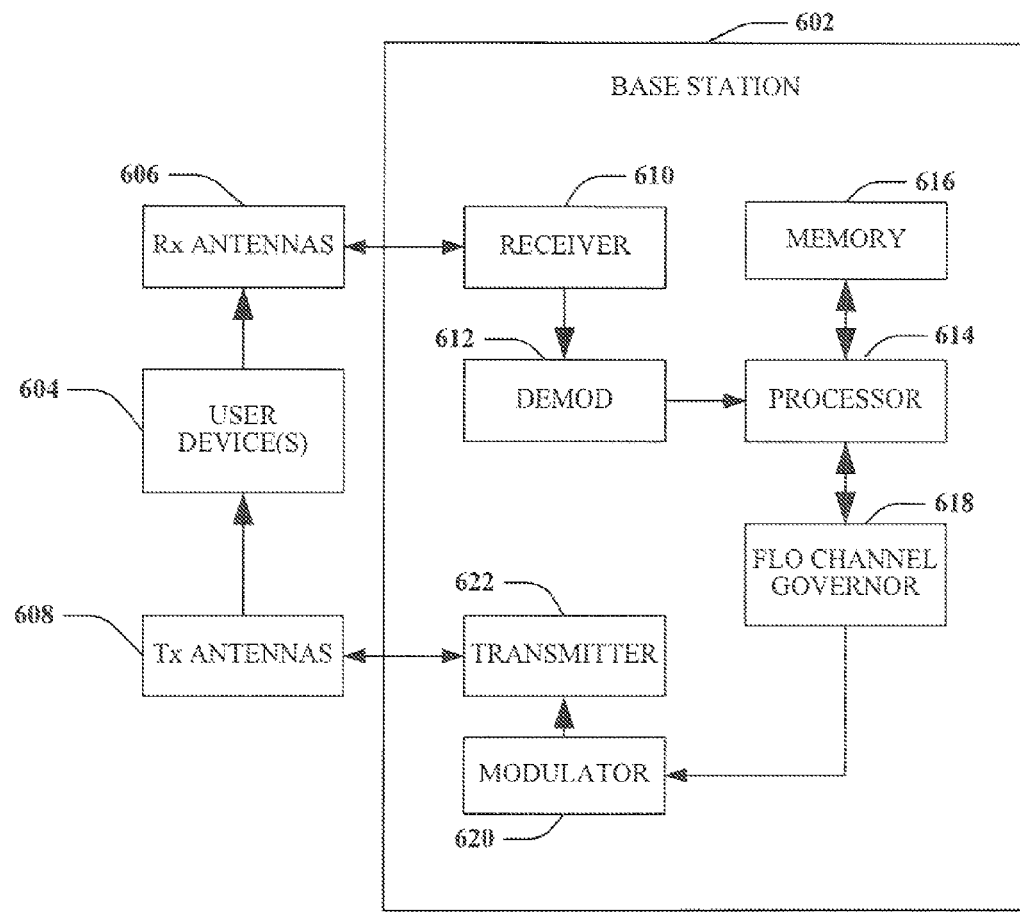
FIG. 6 is an illustration of a system that facilitates providing multiple RF channels in a wireless communication environment in accordance with various aspects.

FIG. 6 is an illustration of a system 600 that facilitates providing multiple RF channels in a wireless communication environment in accordance with various aspects. System 600 comprises a base station 602 with a receiver 610 that receives signal(s) from one or more user devices 604 through a plurality of receive antennas 606, and a transmitter 622 that transmits to the one or more user devices 604 through a transmit antenna 608. Receiver 610 can receive information from receive antennas 606 and is operatively associated with a demodulator 612 that demodulates received information. Demodulated symbols are analyzed by a processor 614 that is similar to the processor described above with regard to FIG. 5, and which is coupled to a memory 616 that stores information related to user identities, RF channel frequencies, data transmitted over RF channels, lookup tables related thereto, and/or any other suitable information related to performing the various actions and functions set forth herein. Processor 614 is further coupled to a FLO channel governor 618 that synchronizes superframe transmissions on multiple RF channels, which can facilitate RF channel switching by user device(s) 604 as described with regard to preceding figures. A modulator 620 can multiplex a signal for transmission by transmitter 622 through transmit antenna 608 to user device(s) 604. In this manner, base station 602 can interact with user device(s) 604 to permit RF channel switching, FLO signal detection, channel monitoring, etc.

Figure 7:
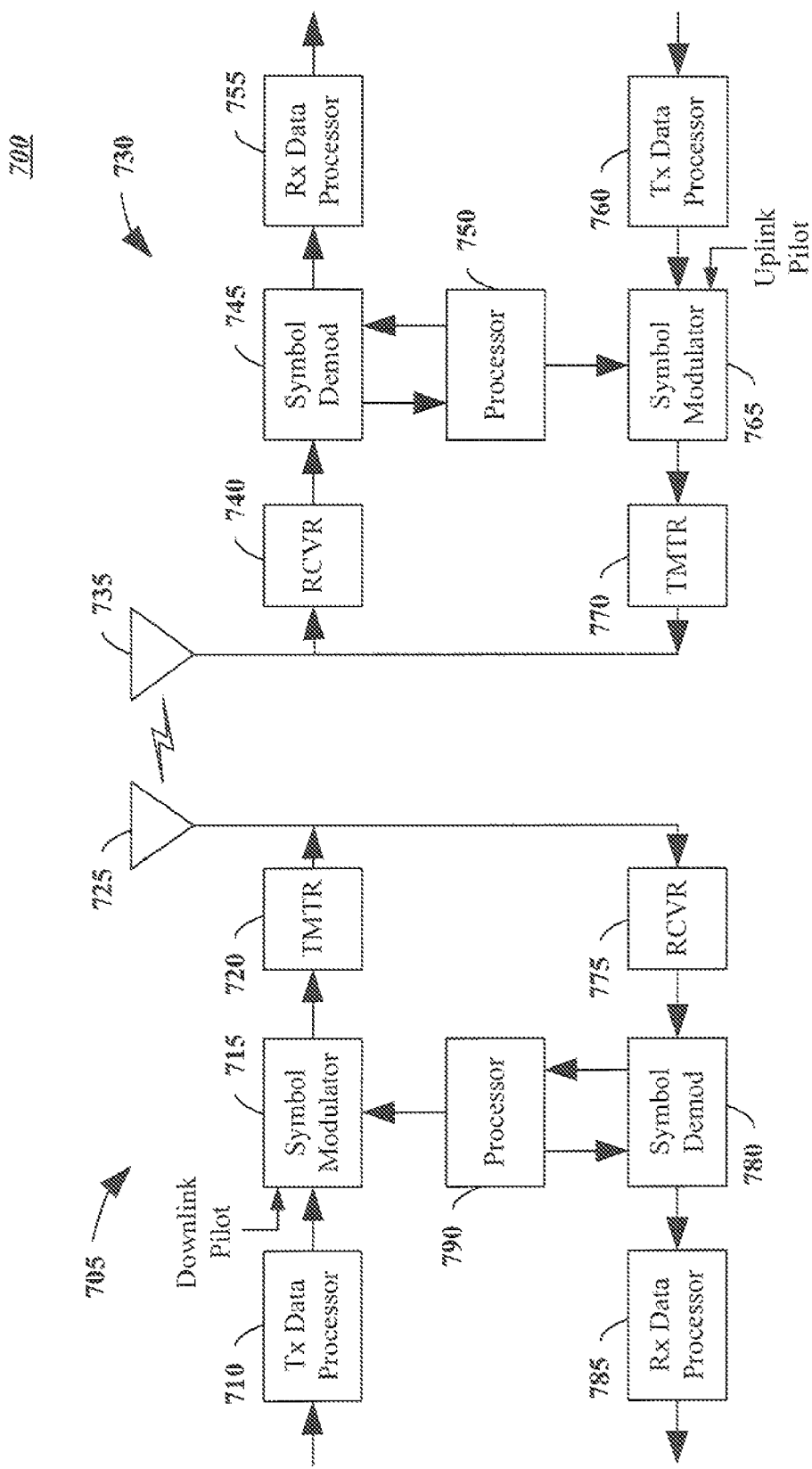
FIG. 7 is an illustration of a wireless network environment that can be employed in conjunction with the various systems and methods described herein.

FIG. 7 shows an exemplary wireless communication system 700 in which the wireless device, also referred to as a terminal, and base station may operate. The wireless communication system 700 depicts one base station and one terminal for sake of brevity. However, it is to be appreciated that the system can include more than one base station and/or more than one terminal, wherein additional base stations and/or terminals can be substantially similar or different for the exemplary base station and terminal described below. In addition, it is to be appreciated that the base station and/or the terminal can employ the systems and/or methods described herein to facilitate wireless communication there between.

Referring now to FIG. 7, on a downlink, at access point 705, a transmit (TX) data processor 710 receives, formats, codes, interleaves, and modulates (or symbol maps) traffic data and provides modulation symbols ("data symbols"). A symbol modulator 715 receives and processes the data symbols and pilot symbols and provides a stream of symbols. A symbol modulator 720 multiplexes data and pilot symbols and provides them to a transmitter unit (TMTR) 720. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 720 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 725 to the terminals. At terminal 730, an antenna 735 receives the downlink signal and provides a received signal to a receiver unit (RCVR) 740. Receiver unit 740 conditions (e.g., filters, amplifies, and frequency downconverts) the received signal and digitizes the conditioned signal to obtain samples. A symbol demodulator 745 demodulates and provides received pilot symbols to a processor 750 for channel estimation. Symbol demodulator 745 further receives a frequency response estimate for the downlink from processor 750, performs data demodulation on the received data symbols to obtain data symbol estimates (which are estimates of the transmitted data symbols), and provides the data symbol estimates to an RX data processor 755, which demodulates (i.e., symbol demaps), deinterleaves, and decodes the data symbol estimates to recover the transmitted traffic data. The processing by symbol demodulator 745 and RX data processor 755 is complementary to the processing by symbol modulator 715 and TX data processor 710, respectively, at access point 705.

On the uplink, a TX data processor 760 processes traffic data and provides data symbols. A symbol modulator 765 receives and multiplexes the data symbols with pilot symbols, performs modulation, and provides a stream of symbols. A transmitter unit 770 then receives and processes the stream of symbols to generate an uplink signal, which is transmitted by the antenna 735 to the access point 1305.

At access point 705, the uplink signal from terminal 730 is received by the antenna 725 and processed by a receiver unit 775 to obtain samples. A symbol demodulator 780 then processes the samples and provides received pilot symbols and data symbol estimates for the uplink. An RX data processor 785 processes the data symbol estimates to recover the traffic data transmitted by terminal 730. A processor 790 performs channel estimation for each active terminal transmitting on the uplink. Multiple terminals may transmit pilot concurrently on the uplink on their respective assigned sets of pilot subbands, where the pilot subband sets may be interlaced.

Processors 790 and 750 direct (e.g., control, coordinate, manage, etc.) operation at access point 705 and terminal 730, respectively. Respective processors 790 and 750 can be associated with memory units (not shown) that store program codes and data. Processors 790 and 750 can also perform computations to derive frequency and impulse response estimates for the uplink and downlink, respectively.

The techniques described herein may be implemented by various means. For example, these techniques may be implemented in hardware, software, or a combination thereof. For a hardware implementation, the processing units used for FLO network acquisition may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 790 and 750.

What has been described above includes exemplary embodiments. It is, of course, not possible to describe every conceivable combination of components or methodologies for purposes of describing the embodiments, but one of ordinary skill in the art may recognize that many further combinations and permutations are possible. Accordingly, these embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of acquiring a broadcast stream network in a radio frequency (RF) in a device operating in a wireless communication environment, comprising:
- selecting a RF from a first list stored on the device;
- selecting a broadcast stream network signal parameter (SP) from a second list stored on the device, wherein the selected broadcast stream network SP includes at least one of a Fast Fourier Transform (FFT) size, a cyclic prefix length, and a slot to interface mapping;
- determining if a first parameter is found using the selected RF and broadcast stream network SP;
- upon determination that the first parameter is found, enabling the use of the selected RF and broadcast stream network SP to communicate in the broadcast stream network; and
- decoding, on the device, a received broadcast stream waveform using the selected broadcast stream network SP if the first parameter is found.

2. The method of claim 1, wherein the selected broadcast stream network SP has a correlation with the selected RF from the first list.

3. The method of claim 1, wherein determining if the first parameter is found comprises determining if the first parameter is found in a predetermined time period.

4. The method of claim 1, wherein the first parameter is a time-division multiplexed (TDM) pilot.

5. The method of claim 1, further comprising determining if a wide area overhead information symbol (WOIS) is found.

6. The method of claim 5, further comprising enabling the use of the selected broadcast stream network SP to communicate in the broadcast stream network upon determination of the existence of the WOIS.

7. The method of claim 5, further comprising determining an energy level of a wide area identity (WID) channel upon determination that the WOIS is not found.

8. The method of claim 7, wherein determining the energy level of the WID channel comprises determining if the energy level of the WID channel is above a predetermined threshold level.

9. The method of claim 8, further comprising enabling the use of the selected broadcast stream network SP to communicate in the broadcast stream network upon determination that the energy level of the WID channel is above the predetermined threshold level.

10. An apparatus that facilitates detecting a broadcast stream network in a wireless communication environment, comprising:
- a memory that stores a first list of RF channels and a broadcast stream network signal parameter (SP), wherein the selected broadcast stream network SP includes at least one of a Fast Fourier Transform (FFT) size, a cyclic prefix length, and a slot to interface mapping;
- a processor, coupled to the memory, that selects a RF channel from the first list;
- a receiver coupled to the processor that communicates with a RF channel; and
- wherein the processor determines if a first parameter is found using the selected RF channel and the selected broadcast stream network SP, upon determination that the first parameter is found, enables the use of the selected RF channel and the selected broadcast stream network SP to communicate in the broadcast stream network, and decodes received broadcast stream waveforms using the selected broadcast stream network SP if the first parameter is found.

11. The apparatus of claim 10, wherein the selected broadcast stream network SP has a correlation with the selected RF channel from the first list.

12. The apparatus of claim 10, wherein the processor determines if the first parameter is found by determining if the first parameter is found in a predetermined time period.

13. The apparatus of claim 10, wherein the first parameter is a time-division multiplexed (TDM) pilot.

14. The apparatus of claim 10, wherein the processor further determines if a wide area overhead information symbol (WOIS) is found.

15. The apparatus of claim 14, wherein the processor enables the use of the selected broadcast stream network SP in the receiver to communicate in the broadcast stream network upon determination of the existence of the WOIS.

16. The apparatus of claim 14, wherein the processor further determines an energy level of a wide area identity (WID) channel upon determination that the WOIS is not found.

17. The apparatus of claim 16, wherein the processor determines the energy level of the WID channel by determining if the energy level of the WID channel is above the predetermined threshold level.

18. The apparatus of claim 17, wherein the processor enables the use of the selected broadcast stream network SP to communicate in the broadcast stream network upon determination that the energy level of the WID channel is above the predetermined threshold level.

19. A product comprising a non-transitory machine-readable media with programming code stored thereon that, when executed by a processor, implements a method of acquiring a broadcast stream network in a radio frequency (RF) in a wireless communication environment, the method comprising:
- selecting a RF from a first list;
- selecting a broadcast stream network signal parameter (SP) from a second list, wherein the selected broadcast stream network SP includes at least one of a Fast Fourier Transform (FFT) size, a cyclic prefix length, and a slot to interface mapping;
- determining if a first parameter is found using the selected RF and broadcast stream network SP;
- upon determination that the first parameter is found, enabling the use of the selected RF and the selected broadcast stream network SP to communicate in the broadcast stream network; and
- decoding of a received broadcast stream waveform using the selected broadcast stream network SP if the first parameter is found.

20. The product of claim 19, wherein the selected broadcast stream network SP has a correlation with the selected RF from the first list.

21. The product of claim 19, wherein determining if the first parameter is found comprises determining if the first parameter is found in a predetermined time period.

22. The product of claim 19, wherein the first parameter is a time-division multiplexed (TDM) pilot.

23. The product of claim 19, wherein the method further comprises determining if a wide area overhead information symbol (WOIS) is found.

24. The product of claim 23, wherein the method further comprises enabling the use of the selected broadcast stream network SP to communicate in the broadcast stream network upon determination of the existence of the WOIS.

25. The product of claim 23, wherein the method further comprises determining an energy level of a wide area identity (WID) channel upon determination that the WOIS is not found.

26. The product of claim 25, wherein determining the energy level of the WID channel comprises determining if the energy level of the WID channel is above a predetermined threshold level.

27. The product of claim 26, wherein the method further comprises enabling the use of the selected broadcast stream network SP to communicate in the broadcast stream network upon determination that the energy level of the WID channel is above the predetermined threshold level.

28. A device for acquiring a broadcast stream network in a radio frequency (RF) in a wireless communication environment, comprising:
- means for selecting a RF from a first list stored on the device;
- means for selecting a broadcast stream network signal parameter (SP) from a second list stored on the device, wherein the selected broadcast stream network SP includes at least one of a Fast Fourier Transform (FFT) size, a cyclic prefix length, and a slot to interface mapping;
- means for determining if a first parameter is found using the selected RF and broadcast stream network SP;
- means for enabling, upon determination that the first parameter is found, the use of the selected RF and broadcast stream network SP to communicate in the broadcast stream network; and
- means for decoding, on the device, a received broadcast stream waveform using the selected broadcast stream network SP if the first parameter is found.

29. The device of claim 28, wherein the selected broadcast stream network SP has a correlation with the selected RF from the first list.

30. The device of claim 28, wherein the means for determining if the first parameter is found comprises means for determining if the first parameter is found in a predetermined time period.

31. The device of claim 28, wherein the first parameter is a time-division multiplexed (TDM) pilot.

32. The device of claim 28, further comprising means for determining if a wide area overhead information symbol (WOIS) is found.

33. The device of claim 32, further comprising means for enabling the use of the selected broadcast stream network SP to communicate in the broadcast stream network upon determination of the existence of the WOIS.

34. The device of claim 32, further comprising means for determining an energy level of a wide area identity (WID) channel upon determination that the WOIS is not found.

35. The device of claim 34, wherein the means for determining the energy level of the WID channel comprises means for determining if the energy level of the WID channel is above a predetermined threshold level.

36. The device of claim 35, further comprising means for enabling the use of the selected broadcast stream network SP to communicate in the broadcast stream network upon determination that the energy level of the WID channel is above the predetermined threshold level.

\* \* \* \* \*